Patented July 18, 1950

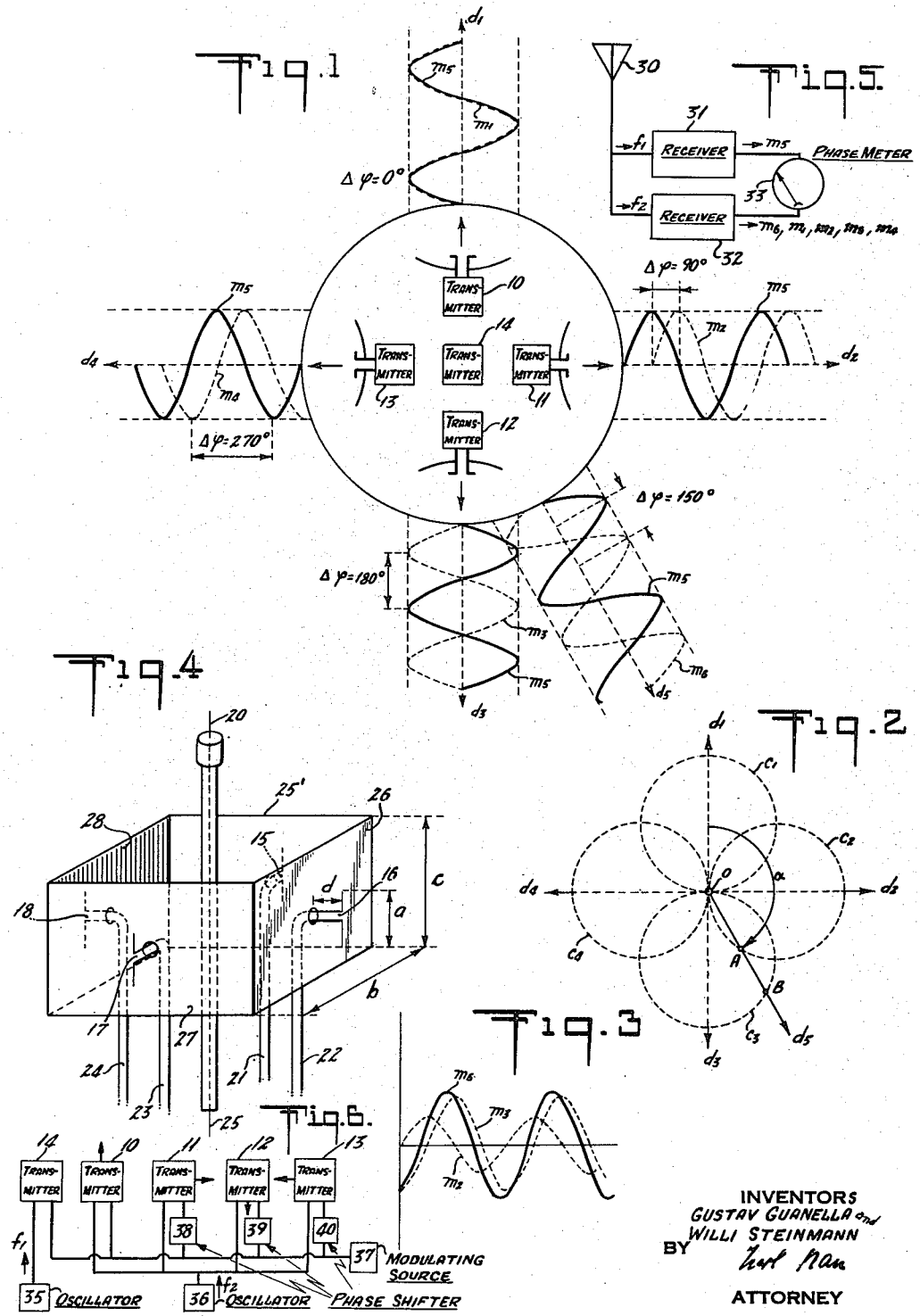

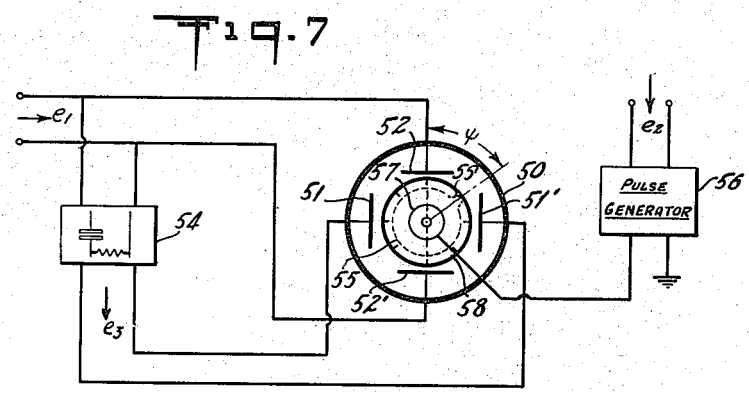
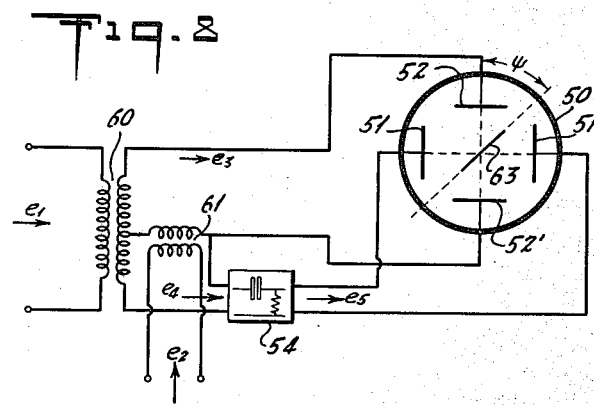
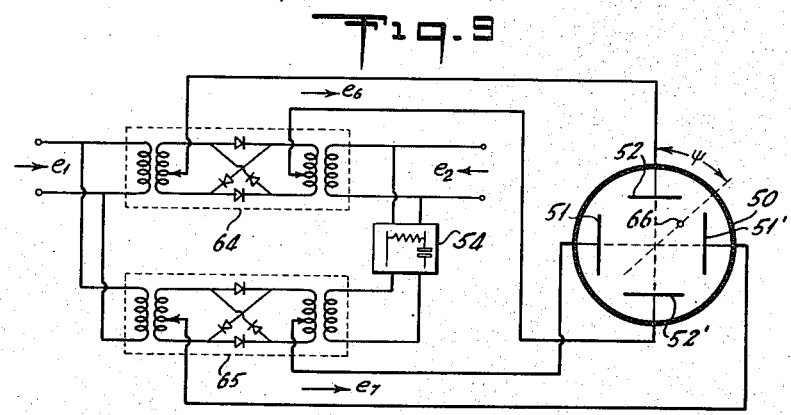

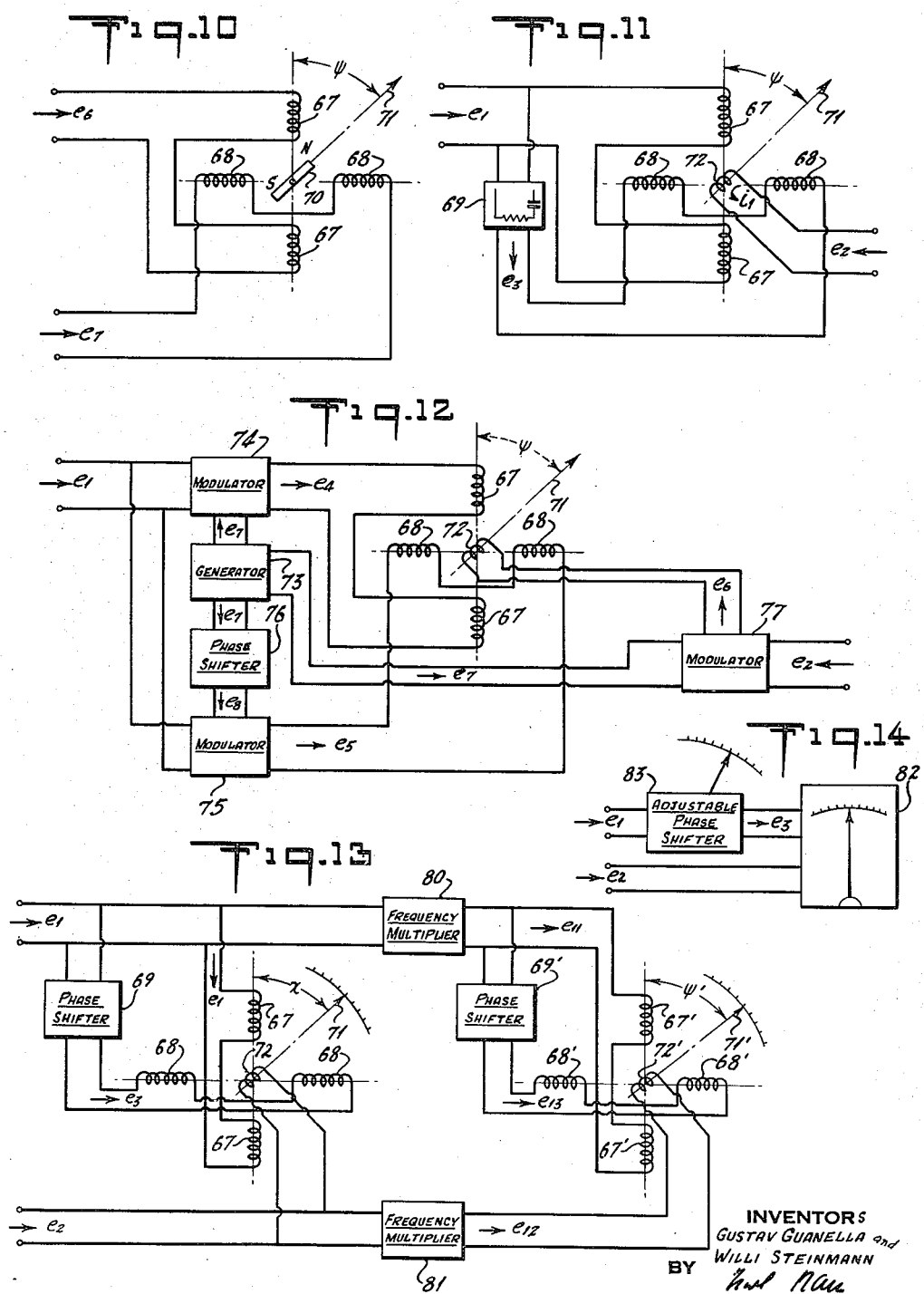

2,515,344

UNITED STATES PATENT OFFICE 2,515,344

RADIO BEACON SYSTEM

Gustav Guanella and Willi Steinmann, Zurich, Switzerland, assignors to Radio Patents Corporation, New York, N. Y., a corporation of New York Application March 7, 1947, Serial No. 733,208
In Switzerland April 1, 1946

11 Claims. (Cl. 343—102)

The present invention relates to a novel method of and means for determining the direction and/or position of a radio receiving station with respect to a transmitting station, more particularly for determining or controlling the position of a movable craft such as a ship, airplane or the like with respect to one or more fixed points.

It has already been proposed in order to determine the direction or angular position of a receiver in space, aside from the known methods of direction finding by triangulation by means of at least two ground stations or two directional receivers, to provide a rotating radio system comprising a member of directional or beam transmitters revolving about their axes and transmitting signals characteristic of the instantaneous angular positions or transmitting directions.

An object of the present invention is the provision of a directional radio system or beacon of the latter type which is substantially devoid of any rotating parts and designed to enable a receiver equipped with ordinary receiving apparatus to determine its direction or angular position by a direct reading or indication.

Another object is to provide a radio beacon of the above type of simple construction, using very short and ultra short electromagnetic waves and especially suitable as a navigational aid for ships, airplanes or other moving craft.

With the foregoing objects in view, the invention involves generally the provision of a transmitting beacon system embodying purely electrical means for radiating a signal in all directions the phase of which varies in proportion to the direction within a desired angular operating range encompassing a full 360° angle.

More specifically, the invention involves the provision at a first point, such as a ground station, of a first omni-directional transmitter operating at a first transmitting or carrier frequency and being modulated in accordance with a preferably sinusoidal signal of predetermined frequency, and at least two further transmitters also located at said first point and both operating at a second transmitting or carrier frequency different from said first carrier frequency, both said further transmitters also being modulated in accordance with said modulating signal of said first or omni-directional transmitter. At least one of said further transmitters is a directional transmitter having a desired directional or polar radiation characteristic, whereby to result in a varying relative received signal amplitude of said further transmitters in a distant receiver located at a second point such as on a ship, airplane or any other moving vehicle, said relative amplitude depending upon the direction or angular position of said receiver with respect to the transmitting beacon. The modulating signal phases for said further transmitters have a predetermined fixed relation with respect to each other and to the modulating phase of said omni-directional transmitter, whereby the phase of a combined signal obtained by superimposing the signals received from said further transmitters in relation to the phase of the signal received from said omni-directional transmitter, varies in proportion to the direction or angular position of said receiver with respect to said transmitting beacon. Accordingly, by measuring or translating this varying phase angle by means of a suitable phase indicator or translating device, a direct indication of the direction of said receiver with regard to the transmitting beacon is obtained. If both further transmitters are of the directional type, their radiation should be such as to cause the respective polar radiation patterns to overlap each other at least partially to result in a combined receiving signal within a desired angular operating range.

In a special embodiment of the invention, the beacon system comprises an omni-directional transmitter and four suitably oriented directional transmitters radiating with correspondingly related modulating phases in such a manner as to afford in a direct reading direction indication over a full 360° range or angle, as will be described in greater detail hereafter.

Accordingly, another object of the invention is the provision of a radio transmitting beacon suitable for indicating the direction of a moving craft within a full 360° angle or range.

Another object is to provide improved means for indicating the phase of an alternating current or voltage suitable for use in connection with the invention and other applications.

Further objects of the invention are to provide a radio beacon of the above type which requires a limited number of individual transmitters; which is of small size and bulk and can be accommodated within a limited space; which is simple in design and economical in operation; and which will enable the use of existing receiving apparatus, substantially without the necessity of any special circuits and receiving devices.

The above and further objects as well as novel aspects of the invention will become more apparent from the following detailed description taken in reference to the accompanying drawings forming part of this specification and wherein:

Figure 1 is a schematic diagram of a transmitting beacon constructed in accordance with the principles of the invention;

Figure 2 is a polar radiation diagram illustrating the function and operation of Figure 1;

Figure 3 is a theoretical diagram further illustrating the function of the invention;

Figure 4 illustrates an antenna structure of a short wave radio beacon according to the invention;

Figure 5 is a block circuit diagram of a simple receiver for use in connection with the invention;

Figure 6 is a block circuit diagram of a complete transmitting beacon shown in the preceding views of the drawing;

Figures 7, 8 and 9 are circuit diagrams of various types of direct reading phase indicating devices using a cathode ray tube as an indicating element and suitable for use with the invention and other applications;

Figures 10, 11 and 12 are further circuit diagrams of direct reading phase indicating devices using a magnetic device as a phase responsive element;

Figure 13 is a diagram of a twin-phase indicator according to the invention for both coarse and fine phase indication; and Figure 14 is a block diagram of a compensating type manually operable phase measuring device suitable for use in connection with the invention.

Like reference characters identify like parts throughout the different views of the drawings.

Referring to Figures 1 and 2, there are shown schematically and by way of example four directional transmitters or radiators 10, 11, 12 and 13 located at a first point 0 (Fig. 2) and which may be of any suitable type known in the art. All four directional transmitters operate on the same transmitting or carrier frequency $f_1$ and, in the example shown, are oriented with their main directional axes pointing in the four compass directions as indicated by the arrows or radiating directions $d_1$, $d_2$, $d_3$ and $d_4$, successively spaced by angles of 90° in the manner shown and readily understood. The directional or polar radiation diagrams of the transmitters 10, 11, 12, and 13 are advantageously of a circular shape as shown at $c_1$, $c_2$, $c_3$ and $c_4$, respectively in Figure 2. Such radiation patterns can be obtained by any suitable means such as dipole antennae in combination with suitable reflectors, in a manner well known and shown later on.

There is furthermore shown in Figure 1 an omni-directional transmitter or radiator 14 also located at point 0 and operating at a carrier or transmitting frequency $f_2$ substantially different from the carrier frequency $f_1$ of the directional transmitters 10, 11, 12 and 13. When using very short or ultra short waves as operating frequencies, the difference between the carrier frequencies $f_1$ and $f_2$ is advantageously about one megacycle although this value may be varied to suit existing conditions and requirements.

All the five transmitters 10, 11, 12, 13 and 14 of the transmitting beacon are modulated in accordance with a single modulating signal of fixed frequency, say about 50 cycles, in such a manner that the modulating phases of the omni-directional transmitter 14 and the first directional transmitter 10 are alike, while the modulating phases of the remaining directional transmitters differ successively by 90° corresponding to the respective radiating directions with respect to transmitter 10. In other words, the transmitters 11, 12 and 13 operate with modulating phases of 90°, 180° and 270°, respectively, relative to the modulating phase of the directional transmitter 10 and the omni-directional transmitter 14, which latter serves to provide a fixed reference phase for the beacon, as will become further apparent from the following.

More specifically in Figure 1, the curves $m_1$, $m_2$, $m_3$, $m_4$, and $m_5$ illustrate the modulating signal voltages radiated by the respective transmitters 10, 11, 12, 13 and 14 at a given instant. Due to the orientation of the directional transmitters or radiators 10, 11, 12, and 13 to radiate in the compass directions $d_1$, $d_2$, $d_3$, and $d_4$, respectively, and due to the specific phase relation between the modulating voltages corresponding to said directions as described, the phase differences of 0°, 90°, 180°, and 270° between the omni-directional modulating signal and the respective directional modulating signals are characteristic of the respective directions or quadrantal angles, as is readily understood and indicated in the drawings. Considering any other direction, such as direction $d_5$ within the second quadrant between directions $d_2$ and $d_3$, a combination or superposition of both modulating voltages $m_2$ and $m_3$ of the directional transmitters 11 and 12 located both to the right and left of the directional line $d_5$, will result in a single composite modulating voltage $m_6$ as indicated in the drawing. This latter has a frequency equal to the common modulating frequency of all the transmitters and a phase with respect to the reference phase or phase of the omni-directional signal $m_5$ somewhere between 90° and 180° or the modulating phases of the transmitters 11 and 12.

In case of circular radiation patterns of the directional transmitters as shown in Figure 2, the phase of the combined modulating voltage $m_6$ corresponding to the direction $d_5$ will be directly proportional to the angular position or direction of line $d_5$ due to the relative variation of the amplitudes of voltages $m_2$ and $m_3$ as represented by distances OA and OB, respectively, in Figure 2.

Referring to Figure 3, the curves representing the modulating voltages $m_2$ and $m_3$ are shown in greater detail displaced by a 90° angle from each other and having a relative amplitude corresponding to the direction $d_5$ as shown in Figure 2. The resultant voltage $m_6$ obtained by superposition of voltage $m_2$ and $m_3$ has a new phase corresponding to and in the present example being directly proportional to the directional angle $a$ of line $d_5$, i. e., about 150° with the direction $d_1$ serving as reference or zero direction in the example shown. More specifically, voltage $m_6$ has a phase angle of 60° relative to the voltage $m_2$ and accordingly its phase angle with voltage $m_5$ of the omni-directional or reference transmitter will be 150°, provided the directional line $d_5$ also includes an angle of 150° with the zero or reference direction $d_1$.

There is thus provided by the invention a directional transmitter or radio beacon system, whereby in a receiver of substantially ordinary construction two demodulated signals may be obtained of like frequency but having a varying relative phase corresponding to the direction or angular position of said receiver in respect to a given reference line or zero direction.

According to a modification of the invention, the carrier frequencies of the directional transmitters 10, 11, 12 and 13 may differ from each other by amounts substantially less than the difference therebetween and the omni-directional transmitting frequency $f_2$, such as about a kilocycle in the example mentioned. In this manner, standing waves in free space are avoided. However, in this case, an additional beat frequency of one kilocycle will be superimposed upon the demodulated voltage $m_6$ which may be removed by means of a suitable filter such as a low pass filter, in a manner well understood.

While the system shown in Figure 1 operates within all four quadrants or within a full 360° range, it will be understood that two of the directional transmitters may be omitted, if operation within a single quadrant only is desired. Thus by omitting the transmitters 12 and 13, the system may be used for operation within the first quadrant if a direction indication or control within a limited angular range is required, such as in aircraft approach or blind landing systems and the like. In the latter case, the relative orientation and modulating phase difference of the directional transmitters may be less than 90° to obtain an operating range of reduced angular spread, as is readily understood.

According to a further modification of the invention as applied to a limited angular range, such as a single quadrant or less, one of the two directional transmitters may be replaced by an omni-directional transmitter, whereby the entire system comprises a single directional transmitter and the two omni-directional transmitters one of which serves to radiate a reference phase, while the other cooperates with the directional transmitter to produce a signal of varying phase on account of the relative amplitude between the directionally and non-directionally received signals, respectively. Again in this case, the omni-directional or reference transmitter operates at a frequency substantially different from that of the remaining transmitters. The latter may operate at the same or different frequencies to prevent standing waves, in substantially the manner as described hereinabove.

In such cases, where the relative orientation and the relative modulating phases of the directional transmitters differ from each other or where a single directional transmitter is employed cooperating with an omni-directional transmitter to produce a varying combined signal phase depending on the direction of the receiver, the phase of the combined received signal will bear a relation to the direction different from the direct proportionality for the case where both the radiating directions and modulating phases are in direct correspondence as in the example shown and described above. In either case, the direction may be directly read upon a phase indicator provided with a suitably calibrated scale or dial, or the varying phase of the output signal voltage or current may be converted into proportionate amplitude changes by means of a phase discriminator of known type and serve to energize a suitable translating device such as an indicator, recorder, steering mechanism or the like.

Referring to Figure 4 there is shown a structural embodiment of a short wave beacon system constructed in accordance with the principles of the invention. The directional radiators are comprised of dipole antennae 15, 16, 17 and 18 symmetrically arranged about an omni-directional antenna 20 of known construction. Numerals 21, 22, 23, 24 and 25 indicate the feeders leading from the antenna to suitable oscillation generators. In order to obtain a circular radiation pattern for the dipoles 15, 16, 17 and 18, the latter are provided with reflector walls 25', 26, 27 and 28, respectively, suitably spaced therefrom and forming a box-shaped structure, as shown in the drawing. Considering a wave length of two meters for the directional transmitters, the approximate dimensions $a$ of the dipoles will be one meter, the dimensions for the reflectors will be $b$ equal to 3 meters and $c$ equal to 2 meters, while the spacing of the dipoles from the reflector walls will be about $d$ equal to .5 meter. The omni-directional antenna 20 projects about 2.5 meters above the upper edge of the reflectors. If the characteristics $c_1$, $c_2$, $c_3$ and $c_4$ deviate from a true circular pattern, the error in the bearing indication caused thereby can be taken into account in a simple manner by a proper calibration of the phase or direction indicator scale in accordance with well known practice.

Referring to Figure 5, there is shown in block diagram form a receiver suitable for use in connection with the transmitting beacon according to the invention. A receiving antenna 30 of suitable construction is connected to a pair of receiving channels 31 and 32 which may be of standard construction including both RF and IF sections and one of which serves to receive the omni-directional or reference transmitter at frequency $f_2$, while the other serves to receive the directional transmitters at frequency $f_1$. Both receivers include suitable demodulators, whereby to supply demodulated voltages $m_5$ and $m_6$ of relatively varying phase indicated by a suitable phase meter 33.

In case of aircraft, the receiver may comprise an already existing receiving apparatus to which an additional receiving channel may be added. The indicator may be in the form of a standard $\cos \varphi$ meter calibrated to provide a direct direction indication, or of the special type described hereafter.

In order to provide secrecy of the direction indication, the direction corresponding to zero phase difference may be varied according to a prearranged schedule. This may be effected by rotating the entire transmitting beacon or radiating structure. It is furthermore possible to transmit the relation of the zero phase to a particular direction which is to be kept secret by means of a special modulating signal impressed upon the carrier frequency of the omni-directional transmitter.

Referring to Figure 6, there is shown in block diagram form a complete transmitter system for a radio beacon of the type shown in the preceding illustrations. The omni-directional transmitter 14 is energized by a suitable oscillator or carrier generator 35 producing a transmitting frequency $f_2$, while the directional transmitters 10, 11, 12 and 13 are all energized by a separate oscillator 36 producing a frequency of $f_1$. All the transmitters are furthermore controlled by a single modulating source 37 producing a desired signal frequency. The omni-directional transmitter 14 and the directional transmitter 10 are directly modulated by the source 37 so as to radiate at an equal modulating phase, while suitable phase shifting devices 38, 39 and 40 are shown connected between the modulating source 37 and the directional transmitter 11, 12 and 13, respectively, to produce the required modulating phase shifts of 90°, 180°, and 270°, respectively.

Referring to Figure 7, there is shown a simple direct reading phase meter, utilizing a cathode ray tube as an indicating element. The voltages whose relative phase angle is to be determined are indicated at $e_1$ and $e_2$ and may be the output voltages $m_5$, and $m_1$, $m_2$, $m_3$, $m_4$, $m_6$, respectively, of a beacon receiver according to the invention as shown in Figure 5. One of the voltages, i. e., voltage $e_1$ in the example shown, is utilized to produce a continuously rotating electron beam in the cathode ray indicator 50 comprising in a known manner a pair of orthogonal deflecting systems such as two pairs of electrostatic deflecting plates 51—51', and 52—52'. Voltage $e_1$ is applied to the deflecting plates 52—52' directly and to the plates 51—51' by way of a quadrature phase shifting device 53, to provide a deflecting voltage $e_3$ having its phase displaced by 90° with respect to the voltage $e_1$. Accordingly, deflecting voltages $e_1$ and $e_3$ will result in a revolving electric field, whereby to cause the cathode ray to describe a circular path upon the fluorescent viewing screen of the tube, as indicated by the dotted line 55. The cathode ray is additionally deflected in a radial direction by a pulse voltage produced in a pulse generator 56 of known construction and controlled by or synchronized with the second input voltage $e_2$. Pulse generators of this type are well known and the design of generator 56 is such that voltage $e_2$ serves as a control or trigger to produce a single pulse voltage during each period, whereby the time position of said pulse corresponds to the phase of voltage $e_2$ in relation to voltage $e_1$, as will be understood.

A simple means for converting the voltage $e_2$ into a pulse voltage consists in distorting the original sinusoidal voltage shape into a substantially rectangular or square-topped voltage by passing the original voltage through a saturated vacuum tube or the like and applying the resultant output voltage to a differentiating network of known design. There are obtained in this manner from the output of the differentiating network a series of short positive and negative voltage pulses coinciding with the instants of transition through zero of the original sinusoidal voltage. In order to obtain pulses in a single direction for effecting the radial deflection of the cathode ray, a suitable limiting or amplitude clipping device in the form of a biased rectifier or the like may be employed. Arrangements of this and similar types for converting a sinusoidal voltage into a pulse voltage are well known in the radar and general pulse transmission arts.

Accordingly, the circular trace 55 upon the cathode ray screen will be interrupted by a radial deflection or pip as shown in 55' located at an angle $\psi$ corresponding to the phase angle $\varphi$ between the voltages $e_1$ and $e_2$. It is possible in this manner therefore by the provision of a suitable circular scale 58 to produce a direct indication of the phase angle within a full 360° range. If the phase meter is used for direction indication according to the invention, the calibration may be in directional angles, thus affording a direct indication of direction of the beacon transmitter according to the invention.

As is understood, due to the relatively high frequency of the deflecting voltages $e_1$ and $e_3$ and the pulse voltage supplied by the generator 56, the luminous spot produced by the cathode ray will appear as a continuous circle 55 and deflection pip 55', as a result of the persistence of vision of the eye, or by using a phosphorescent in place of a luminescent material upon the viewing screen.

Figure 8 shows a modified cathode ray phase meter suitable for use in connection with the invention, as well as for general application. According to this embodiment, the sum and difference voltages $e_3$ and $e_4$ are produced from the input voltages $e_1$ and $e_2$ by means of a first split phase or center-tapped transformer 60 and a second transformer 61, in a manner well understood by those skilled in the art. Said sum and difference voltages are then applied to the deflecting plates 51—51' and 52—52', respectively, of the cathode ray indicator 50, after shifting the phase of one of them, i. e., voltage $e_4$ in the example shown, by 90° by means of the phase shifting device 54, resulting in a deflection voltage $e_5$ as shown in the drawing.

In an arrangement of this type, the cathode ray moves along a straight line 63 inclined by an angle $\psi$ equal to one half the phase angle $\varphi$ between the voltages $e_1$ and $e_2$ whose relative phase is to be measured or indicated. This function will be further understood from the following amplitude mathematical analysis, wherein the amplitude values of the various voltages are omitted for sake of simplicity, since they will cancel in the final equation of the reflecting angle, provided that both input voltages $e_1$ and $e_2$ have the same amplitude.

Voltages $e_1$ and $e_2$ may be expressed mathematically as follows:

$$e_1 = \sin wt$$
$$e_2 = \sin (wt + \varphi)$$

From these equations the sum and difference voltages are obtained as follows:

$$e_3 = e_1 + e_2 = 2 \sin\left(wt + \frac{\varphi}{2}\right) \cos \frac{\varphi}{2}$$

$$e_4 = e_1 - e_2 = -2 \cos\left(wt + \frac{\varphi}{2}\right) \sin \frac{\varphi}{2}$$

Voltage $e_4$ is phase shifted by 90° in the phase shifting device 54, resulting in voltage $e_5$ as follows:

$$e_5 = 2 \sin\left(wt + \frac{\varphi}{2}\right) \sin \frac{\varphi}{2}$$

From this the angle $\psi$ is determined as follows:

$$tg\psi = \frac{e_5}{e_3} = tg\frac{\varphi}{2}$$

It follows therefore that $$\psi = \frac{\varphi}{2}$$

i. e., the angle of inclination of the luminous line 63 is equal to one half the phase angle $\varphi$ between the voltages $e_1$ and $e_2$ to be determined. Thus, a scale extending over a 180° arc and calibrated from 0° to 360° will afford a direct phase angle or direction indication.

In the embodiment according to Figure 9 which also uses a cathode ray indicator, a luminous spot 66 is produced upon the cathode ray screen moving along a full circle of 360° with its deflection or angular position being directly proportional to the phase angle to be measured. For this purpose, the input voltages $e_1$ and $e_2$ are mutually intermodulated in a pair of modulators 64 and 65 to produce modulation product voltages which after adequate filtering (not shown) result in a pair of steady or direct current output voltages $e_6$ and $e_7$ applied to the deflection plates 51—51' and 52—52' of the cathode ray indicator 50. In order that the deflection voltages $e_6$ and $e_7$ are proportional to the sine and the cosine, respectively, of the phase angle $\varphi$ between the voltages $e_1$ and $e_2$, to result in an angular position of the luminous spot 66 directly proportional to said angle $\varphi$, one of the input voltages to the modulators 64 and 65, i. e., voltage $e_2$ in the example shown, is passed through a quadrature phase-shifting device 64.

Another simplified phase indicator as shown in Figure 10 consists of a magnetic cross-coil instrument, comprising a pair of coil systems 67 and 68 oriented at an angle of 90° with respect to each other and each being energized by one of the modulator output voltages $e_6$ and $e_7$ obtained from a modulating system according to Figure 9. A polarized or permanent magnet element 70 rotatively arranged between said coils will then assume a position at an angle $\psi$ proportional to the phase angle $\varphi$ to be measured and indicated by a pointer 71 which may cooperate with a suitable phase angle or direction scale.

Figure 11 shows still another magnetic phase indicator in the form of a dynamic instrument comprising a pair of coil systems 67 and 68 similar to those in Figure 10 and a moving coil 72 carrying the pointer 71 in place of the permanent magnet 70 of the preceding embodiment. One of the input voltages, i. e., voltage $e_1$ in the example shown, is applied directly to the coil system 67 and indirectly to the coil system 68 by way of a phase shifting device 69 to produce an exciting voltage $e_3$ having its phase rotated by 90° relative to the phase of the voltage $e_1$. Moving coil 72 is energized by the voltage $e_2$, whereby the exciting current $i$ through the coil 72 will be proportional to the voltage $e_2$. Accordingly, the moving coil will rotate to a position coincident with the resultant magnetic field determined by the deflection angle $\psi$, in such a manner that again the angle will be directly proportional to the phase angle $\varphi$ between voltages $e_1$ and $e_2$ to be measured.

When using the arrangement according to Figure 11, it is possible to operate at high frequencies on account of the relatively large inductances of the instrument. Since the voltages $e_1$ and $e_2$ whose phase is to be determined are usually of relatively high frequency, it is advisable to employ a superheterodyne system for reducing the frequency from radio frequency to an intermediate frequency. In an arrangement of this type, if both high frequency input voltages $e_1$ and $e_2$ are combined with the oscillation of the same beating oscillator, there will be obtained a pair of intermediate voltages having a relative phase difference corresponding to the phase difference between the original high frequency voltages. In this manner, the frequency may be reduced in any desired degree before energizing the instrument to result in a simple design in an efficient and accurate phase indication.

An arrangement of the latter type is shown in block diagram form in Figure 12. In the latter, the high frequency input voltage $e_1$ is simultaneously applied to a pair of modulators or mixers 74 and 75 which are furthermore excited by the output voltage $e_7$ of a beating oscillator or generator 73. One of the beating oscillation components is phase shifted by 90° in the phase shifter 76 before being applied to the respective modulator, i. e., modulator 75 in the example shown. The intermediate frequency rotary field voltages $e_4$ and $e_5$ obtained in this manner are in turn applied to the coil systems 67 and 68 of a dynamic instrument in substantially the same manner as in Figure 7. Similarly, the high frequency input voltage $e_2$ is reduced to the same intermediate frequency by means of the modulator or mixer 77 which is also excited by the output voltage $e_7$ of the beating oscillator 73, to result in an intermediate frequency voltage $e_6$ energizing the moving coil 72 of the instrument. As will be understood, the deflection angle $\psi$ will again be proportional to the phase angle $\varphi$ between the voltages $e_1$ and $e_2$.

According to a further embodiment of the invention, a pair of phase indicating devices may be employed, one being excited directly by the input voltages $e_1$ and $e_2$ and the other being simultaneously excited by said input voltages through a pair of identical frequency multipliers, in such a manner as to result in a pair of separate indications, one of which provides a coarse phase indication, while the other provides a fine measurement of the phase or direction.

An arrangement of this type comprising a pair of phase indicators of the type according to Figure 11 is shown in Figure 13. The instrument 67—68—72 and phase shifter 69 is substantially the same as that shown in Figure 11, while a second substantially identical instrument characterized by corresponding and primed numerals is shown also excited by the voltages $e_1$ and $e_2$ through a pair of identical frequency multipliers 80 and 81 of any known design or construction. Accordingly, the voltages $e_{11}$ and $e_{12}$ supplied by the multipliers 80 and 81 and impressed upon the right-hand instrument will be frequency modulated by a factor $n$ compared with the frequency of the voltages $e_1$ and $e_2$ impressed upon the left-hand instrument. This will result in a corresponding reduction of the angular displacement of the pointer 71' of the right-hand instrument, whereby both instruments may be employed both for coarse and fine phase angle or direction indication.

Thus, assuming the frequency multiplication factor of the multipliers 80 and 91 to be equal to 36, the pointer 71' of the fine indicator will move over a complete 360° angle, while the pointer 71 of the coarse indicator during the same time moves through a 10° angular distance only. Accordingly, by reading both angles $\psi$ and $\psi'$ and calibrating the full 360° scale of pointer 71' to cover a range 0–10°, pointer 71 will indicate the approximate phase or direction while pointer 71' will provide an additional more accurate indication within the limits provided by the system. Thus, assuming that pointer 71 shows a phase or direction angle between 134° and 135° and that the pointer 71' shows an angle of 4.3°, the angle to be measured will be 134.3°.

In place of a direct phase or direction indication, it is furthermore possible to use a compensating type phase meter, requiring a manual operation in carrying out a measurement. Such a system as shown in Figure 14 may comprise a null indicator 82 in the form of a watt meter type or other phase responsive instrument. For measuring the phase, an adjustable phase shifting device 83 having a pointer 84 is inserted in the circuit for one of the input voltages, as shown in the drawing. In operation, the phase adjuster 83 is so controlled manually that the voltages $e_1$ and $e_2$ include a 90° angle as indicated by a special mark or index upon the scale of instrument 82. The position of pointer 84 upon a suitable calibrated scale is then a measure of the phase angle between the voltages $e_1$ and $e_2$.

While the system has been described with particular reference to a horizontal direction finder for indicating the angular direction or position of a first point in respect to a second point in azimuth, it is understood that the system may be equally used for direction indication in elevation in which case the directional transmitters are oriented to radiate in suitably displaced vertical directions.

While there has been shown and described in the foregoing a preferred embodiment of the invention, it is understood that this disclosure is for the purpose of illustration and that various changes in the proportion and arrangement of parts and elements, as well as the substitution of equivalent elements for those herein shown and described, may be made without departing from the spirit and scope of the invention as defined in the appended claims. The specification and drawings are accordingly to be regarded in an illustrative rather than a limiting sense.

We claim:

1. A radio beacon comprising an omni-directional transmitter having a first carrier frequency and being modulated in accordance with a predetermined signal frequency, and at least two further transmitters having carrier frequencies different from said first carrier frequency and also being modulated in accordance with said signal frequency with modulating phases different from each other and having a predetermined relation to the modulating phase of said omni-directional transmitter, at least one of said further transmitters having a directional radiation pattern oriented in a predetermined direction.

2. A radio beacon comprising an omni-directional transmitter having a first carrier frequency and being modulated in accordance with a predetermined signal frequency, at least two directional transmitters having carrier frequencies differing from each other by an amount substantially less than the difference therebetween and said first carrier frequency, said directional transmitters being modulated in accordance with said signal frequency with a predetermined fixed modulating phase relation and being fixedly oriented relative to each other with their directional radiation characteristics at least partially overlapping each other.

3. A radio beacon comprising an omni-directional transmitter having a first carrier frequency and being modulated in accordance with a predetermined signal frequency, at least two directional transmitters having carrier frequencies different from said first carrier frequency and also being modulated in accordance with said signal frequency with a 90° modulating phase relation, said directional transmitters having substantially circular polar radiation patterns oriented at a 90° angle with respect to each other.

4. A radio beacon comprising an omni-directional transmitter having a first carrier frequency and being modulated in accordance with a predetermined signal frequency, and four directional transmitters having carrier frequencies different from said first carrier frequency and having substantially circular radiation patterns oriented along directional lines at 0°, 90°, 180° and 360°, respectively, with respect to a reference direction, and means for modulating said directional transmitters by said signal frequency at relative phases of 0, 90°, 180°, and 270° corresponding to the respective orientation of said transmitters.

5. A radio beacon comprising an omni-directional transmitter having a first carrier frequency and being modulated in accordance with a predetermined signal frequency, and four directional transmitters having equal carrier frequencies different from said first carrier frequency and having substantially circular radiation patterns oriented at directional lines at 0°, 90°, 180° and 270°, respectively, with respect to a reference direction, and means for modulating said directional transmitters by said signal frequency at relative modulating phases of 0, 90°, 180° and 270° corresponding to the respective orientation of said transmitters.

6. A radio beacon comprising an omni-directional transmitter having a first carrier frequency and being modulated in accordance with a predetermined signal frequency, four directional transmitters having carrier frequencies differing from each other by amount substantially less than the difference therebetween and said first carrier frequency, said directional transmitters having substantially circular radiation patterns and being oriented at directional lines at 0°, 90°, 180°, and 270°, respectively, with respect to a reference direction, and means for modulating said directional transmitters by said signal frequency at relative modulating phases of 0°, 90°, 180° and 270° corresponding to the respective orientation of said transmitters.

7. Means for determining the direction between a first and a second point comprising a radio beacon located at said first point, said beacon comprising an omni-directional transmitter having a first carrier frequency and being modulated in accordance with a predetermined signal frequency, at least two further transmitters having carrier frequencies different from said first carrier frequency and also being modulated in accordance with said signal frequency with modulating phases different from each other and having a predetermined relation to the modulating phase of said omni-directional transmitter, at least one of said further transmitters having a directional radiation characteristic oriented in a predetermined direction, and a receiver located at said second point for producing a first output signal varying according to the modulating frequency of said omni-directional transmitter and for producing a second output signal by combination of the modulating frequencies of said further transmitters, and translating means responsive to the relative phase between said first and said second output signal.

8. Means for determining the direction between a first and a second point comprising a radio beacon located at said first point, said beacon comprising an omni-directional transmitter having a first carrier frequency and being modulated in accordance with a predetermined signal frequency, and at least two further directional transmitters having equal carrier frequencies different from said first carrier frequency and also being modulated in accordance with said signal frequency with a predetermined modulating phase relation, said directional transmitters being fixedly oriented to have their directional radiation characteristics at least partially overlapping each other, a radio receiver located at said second point for producing a first output signal varying in accordance with the modulating frequency received from said omni-directional transmitter and for producing a second output signal by combination of the signal frequencies received from said directional transmitters, and translating means responsive to the relative phase between said first and said second output signals.

9. Means for determining the direction between a first and a second point relatively movable with respect to said first point comprising a radio beacon located at said first point, said beacon comprising an omni-directional transmitter having a first carrier frequency and being modulated in accordance with a predetermined signal frequency, at least two directional transmitters having equal carrier frequencies different from said first carrier frequency and also being modulated in accordance with said signal frequency with a 90° modulating phase relation, said directional transmitters having substantially circular radiation characteristics oriented at a 90° angle relative to each other, a radio receiver located at said second point for producing a first output signal varying in accordance with the signal frequency received from said omni-directional transmitter and for producing a second output signal by combination of the signal frequencies received from the said directional transmitters, and translating means responsive to the relative phase between said first and said second output signal.

10. Means for determining the angle direction between a first and a second point relatively movable with respect to said first point, comprising a radio beacon located at said first point, said beacon comprising an omni-directional transmitter having a first carrier frequency and being modulated in accordance with a predetermined signal frequency, and four directional transmitters having carrier frequencies different from said first carrier frequencies and having substantially circular radiation patterns oriented at directional lines of 0°, 90°, 180°, and 270°, respectively, with respect to a reference direction, and means for modulating said directional transmitters by said signal frequency with relative modulating phases of 0°, 90°, 180° and 270° corresponding to the respective orientation of said directional transmitters, a radio receiver located at said second point for producing a first output signal varying in accordance with the modulating signal received from said omni-directional transmitter and for producing a second output signal by combination of the signal frequencies from any two of said directional transmitters located to the left and to the right of the respective receiving direction, and translating means responsive to the relative phase between said first and said second output signal.

11. Means for determining the direction between the first and second point relatively movable with respect to said first point comprising a radio beacon located at said first point, said beacon comprising an omni-directional transmitter having a first carrier frequency and being modulated in accordance with a predetermined signal frequency, and four directional transmitters having equal carrier frequencies different from said first carrier frequencies and having substantially circular radiation patterns oriented at directional lines of 0°, 90°, 180° and 270°, respectively, with respect to a reference direction, and means for modulating said directional transmitter by said signal frequency with relative modulating phases of 0°, 90°, 180° and 270° corresponding to the respective orientation of said directional transmitters, a radio receiver located at said second point for producing a first output signal varying in accordance with the modulating frequency received from said omni-directional transmitter and for producing a second output signal by combination of the signal frequencies received from any two of said directional transmitters located to the left and to the right of the respective receiving direction, and translating means responsive to the relative phase between said first and said second output signal.

GUSTAV GUANELLA.
WILLI STEINMANN.

REFERENCES CITED

The following references are of record in the file of this patent:

UNITED STATES PATENTS

| Number | Name | Date |
|---|---|---|
| 2,144,203 | Shanklin | Jan. 17, 1939 |
| 2,210,651 | Busignies | Aug. 6, 1940 |
| 2,238,965 | Bond | Apr. 22, 1941 |
| 2,253,958 | Luck | Aug. 26, 1941 |
| 2,288,815 | Luck | July 7, 1942 |
| 2,313,699 | Roberts | Mar. 9, 1943 |
| 2,314,795 | Luck | Mar. 23, 1943 |
| 2,320,476 | Schrader et al. | June 1, 1943 |
| 2,328,985 | Luck | Sept. 7, 1943 |
| 2,394,157 | Earp | Feb. 5, 1946 |
| 2,429,634 | Lundberg | Oct. 28, 1947 |

FOREIGN PATENTS

| Number | Country | Date |
|---|---|---|
| 863,451 | France | Apr. 2, 1941 |